(12) United States Patent
Goren et al.

(10) Patent No.: US 11,430,079 B2
(45) Date of Patent: Aug. 30, 2022

(54) METHOD AND SYSTEM FOR USING MULTIPLE PACKING STATIONS IN DELIVERY OF GOODS

(71) Applicant: COMMONSENSE ROBOTICS LTD., Tel Aviv (IL)

(72) Inventors: Eyal Goren, Tel Aviv (IL); Elram Goren, Tel Aviv (IL); Shmuel Ur, Shorashim (IL)

(73) Assignee: GET FABRIC LTD, Tel Aviv (IL)

( * ) Notice: Subject to any disclaimer, the term of this patent is extended or adjusted under 35 U.S.C. 154(b) by 393 days.

(21) Appl. No.: 16/485,324

(22) PCT Filed: Feb. 11, 2018

(86) PCT No.: PCT/IL2018/050155
§ 371 (c)(1),
(2) Date: Aug. 12, 2019

(87) PCT Pub. No.: WO2018/146686
PCT Pub. Date: Aug. 16, 2018

(65) Prior Publication Data
US 2019/0378232 A1    Dec. 12, 2019

Related U.S. Application Data

(60) Provisional application No. 62/457,912, filed on Feb. 12, 2017.

(51) Int. Cl.
*G06Q 50/28* (2012.01)
*G06Q 10/06* (2012.01)

(52) U.S. Cl.
CPC ....... *G06Q 50/28* (2013.01); *G06Q 10/06315* (2013.01); *G06Q 10/06316* (2013.01)

(58) Field of Classification Search
CPC ............ G06Q 50/28; G06Q 10/06315; G06Q 10/06316
See application file for complete search history.

(56) References Cited

U.S. PATENT DOCUMENTS

| 7,979,359 B1 * | 7/2011 | Young | G06Q 10/06 705/28 |
| 9,714,145 B1 * | 7/2017 | Lehmann | B65G 47/905 |

(Continued)

FOREIGN PATENT DOCUMENTS

| AU | 2018250449 A1 * | 11/2018 | ......... B25J 15/0625 |
| WO | 20160066859 A1 | 5/2016 | |

OTHER PUBLICATIONS

Hübner, Alexander, Andreas Holzapfel, and Heinrich Kuhn. "Distribution systems in omni-channel retailing." Business Research 9.2 (2016): 255-296. (Year: 2016).*

(Continued)

*Primary Examiner* — Patricia H Munson
*Assistant Examiner* — Hamzeh Obaid
(74) *Attorney, Agent, or Firm* — Tutunjian & Bitetto, P.C.

(57) ABSTRACT

A method, system and product for using multiple packing stations in delivery of goods. A packing scheme is determined for an order based on an optimality criteria, the scheme comprising a division of a set of items between packing stations, whereby defining one or more subsets of the set of items. The packing scheme further comprising an ordering of the one or more subsets and packing stations paired therewith, by which ordering the paired packing stations are to be utilized for packing the set of items and transporting thereof to the destination, wherein in each packing station, a respective portion of the set of items is to be packed and transported therefrom. Responsive to the optimality criteria being met, instructions for executing the (Continued)

order are issued, whereby the set of items are packed and transported according to the packing scheme.

18 Claims, 3 Drawing Sheets

(56) References Cited

U.S. PATENT DOCUMENTS

| | | | |
|---|---|---|---|
| 10,222,279 B1* | 3/2019 | Legrand, III | G01L 1/20 |
| 10,504,056 B1* | 12/2019 | Stubbs | G06Q 10/087 |
| 2006/0020366 A1 | 1/2006 | Bloom | |
| 2016/0129592 A1* | 5/2016 | Saboo | B25J 9/1661 |
| | | | 700/248 |
| 2017/0323250 A1* | 11/2017 | Lindbo | G06Q 30/0621 |

OTHER PUBLICATIONS

Puligundla, Pradeep, Junho Jung, and Sanghoon Ko. "Carbon dioxide sensors for intelligent food packaging applications." Food Control 25.1 (2012): 328-333. (Year: 2012).*
PCT/ISR/210 Search Report dated Apr. 30, 2018 (pp. 3).

* cited by examiner

METHOD AND SYSTEM FOR USING MULTIPLE PACKING STATIONS IN DELIVERY OF GOODS

CROSS-REFERENCE TO RELATED APPLICATION

This application claims the benefit of U.S. Provisional Application No. 62/457,912 filed Feb. 12, 2017, entitled "DIVIDING ITEMS ORDERED AMONG MULTIPLE PACKING STATIONS", which is hereby incorporated by reference in its entirety without giving rise to disavowment.

TECHNICAL FIELD

The present disclosure relates to combinatorial optimization in general, and to efficient provision of products from several packing posts, in particular.

BACKGROUND

One prominent trend of the modern age is an ever-growing deference of labor from humans to machines. Since the industrial revolution and up until this day and age, the number and extent of tasks in which machines are heavily relied upon for a significant amount of work, or even on occasion are wholly and completely entrusted with their execution through and through, continue to rapidly increase. With the advent of computers and network communications this course of action has been going on with further thrust. Computerized systems and tools nowadays aid or control almost every aspect of human life, from typing documents to managing traffic lights. The emergence of the Internet and World Wide Web (WWW) has similarly marked a growth in translation of activities from the physical space to the virtual one, most notably in the domain of transactions and trading, commonly known as electronic commerce, or e-commerce in short. One particular area of e-commerce is online retailing, wherein consumers shop online for tangible products, via a web site or a mobile application ("app"), for example, and get those products delivered to them, often right to the doorstep of their homes or business establishments. In light of further technological developments in recent years, it is not far-fetched that the process of order fulfillment and shipping for goods purchased online is likely moving towards being automated, either fully or in part, at the least. For example, smart refrigerators may monitor their stock and place an order for replenishing items in short supply via an automated ordering center or inventory management system. The ordered items may be picked up and packed at storage facilities through automated or semi-automated means and transported to their destinations, optionally also through automatic or semi-automatic transportation means of minimal or no human involvement, such as autonomous vehicles, unmanned aircrafts ("drones"), or the like.

BRIEF SUMMARY

One exemplary embodiment of the disclosed subject matter is a computer-implemented method comprising: receiving an order indicating a set of items for delivery to a destination; determining a packing scheme based on one or more optimality criteria, the packing scheme comprising a division of the set of items between two or more packing stations situated in one or more operation locations of one or more suppliers, the division defining one or more subsets of the set of items, each of which subsets being paired with a packing station, the subsets being mutually disjoint, the packing scheme further comprising an ordering of the one or more subsets and packing stations paired therewith, by which ordering the one or more paired packing stations are to be utilized for packing the set of items and transporting thereof to the destination, wherein in each packing station paired with a subset, a respective portion of the set of items in the subset is to be packed and transported therefrom to the destination or a subsequent packing station; and, responsive to determining the one or more optimality criteria being met by the packing scheme, issuing instructions for executing the order by packing and transporting the set of items according to the packing scheme.

Optionally, the one or more optimality criteria comprise criteria selected from the group consisting of: criteria related to a supplier or an operation location thereof; criteria related to a packing station; criteria related to an item; criteria related to a measure of transportation costs; and, any combination thereof.

Optionally, said determining comprises: for each packing station of the two or more packing stations, assigning to each item of the plurality of items a cost for packing the item at the packing station in accordance with a predetermined ordering; and, applying an optimization problem solving process to obtain a packing scheme whereby a total cost of executing the order is minimized.

Optionally, said determining comprises: assigning a cost for each route section from a packing station to the destination and from the packing station to another packing station; and, determining the ordering of the packing stations such that a total cost of an overall route corresponding thereto is minimized.

Optionally, at least one packing station of the two or more packing stations is robotic, and wherein the one or more optimality criteria comprising an optimality criterion whereby utilization of robotic packing stations is prioritized.

Optionally, the packing scheme further comprising for at least one subset an ordering by which items of the subset are to be packed in the packing station paired therewith.

Optionally, the ordering is selected from the group consisting of: an order whereby a single sequence in which all of the subsets are to be packed one after another is defined; and, an order whereby a plurality of sequences each of which containing a different portion of the subsets is defined, wherein in each of the plurality of sequences the respective subsets of the portion are to be packed one after another, and wherein subsets in different sequences of the plurality of sequences are to be packed either concurrently or in an arbitrary order.

Optionally, one or more containers are used for transporting the set of items, wherein the packing scheme comprises for each of the one or more subsets an assigned container of the one or more containers and a transportation route of the assigned container.

Optionally, the set of items are packed and transported within containers of a limited dimension, wherein the one or more optimality criteria comprise a criterion of a number of containers required for packing a respective portion of the set of items in a subset.

Another exemplary embodiment of the disclosed subject matter is an apparatus comprising a processor and coupled memory, the processor being adapted to perform the steps of: receiving an order indicating a set of items for delivery to a destination; determining a packing scheme based on one or more optimality criteria, the packing scheme comprising a division of the set of items between two or more packing stations situated in one or more operation locations of one or more suppliers, the division defining one or more subsets of the set of items, each of which subsets being paired with a packing station, the subsets being mutually disjoint, the packing scheme further comprising an ordering of the one or more subsets and packing stations paired therewith, by which ordering the one or more paired packing stations are to be utilized for packing the set of items and transporting thereof to the destination, wherein in each packing station paired with a subset, a respective portion of the set of items in the subset is to be packed and transported therefrom to the destination or a subsequent packing station; and, responsive to determining the one or more optimality criteria being met by the packing scheme, issuing instructions for executing the order by packing and transporting the set of items according to the packing scheme.

Yet another exemplary embodiment of the disclosed subject matter is a non-transitory computer readable storage medium retaining program instructions, which program instructions when read by a processor, cause the processor to perform a method comprising: receiving an order indicating a set of items for delivery to a destination; determining a packing scheme based on one or more optimality criteria, the packing scheme comprising a division of the set of items between two or more packing stations situated in one or more operation locations of one or more suppliers, the division defining one or more subsets of the set of items, each of which subsets being paired with a packing station, the subsets being mutually disjoint, the packing scheme further comprising an ordering of the one or more subsets and packing stations paired therewith, by which ordering the one or more paired packing stations are to be utilized for packing the set of items and transporting thereof to the destination, wherein in each packing station paired with a subset, a respective portion of the set of items in the subset is to be packed and transported therefrom to the destination or a subsequent packing station; and, responsive to determining the one or more optimality criteria being met by the packing scheme, issuing instructions for executing the order by packing and transporting the set of items according to the packing scheme.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

One technical problem dealt with by the disclosed subject matter is to facilitate cost-effective packing and transportation of goods to a destination. An order specifying a set of one or more items for delivery may be received from a customer. The items may be supplied by a same vendor or by different providers. A supplier of goods may operate at a single place of business or in several locations, for example, a grocery store or a chain of supermarkets. Additionally or alternatively, one warehouse or distribution center may serve many merchants for storing, picking up, packing and shipping of goods to wholesalers, retailers or end consumers. An item may be available at each of a plurality of operation locations, whether all belonging to a same supplier or to different ones, or it may be available only at a subset thereof, or at none.

In each operation location, such as a store, distribution center, warehouse, depot, or the like, there may be one or more packing stations of one or more types. A packing station may be either automated, in full or in part, or non-automated, i.e. manual. A packing station may have universal functionality, in terms of types of products which the packing station may be able to handle packing thereof, or it may have limited functionality, such that only certain types of products may be packed thereby, while others may not, or may be subject to a risk of being damaged in the process, at the least. Additionally or alternatively, workloads at diverse packing stations or even homogenous ones may vary, for example, a packing station may have a workload level that is high, low, moderate, or the like. A workload level at a packing post may change over time or remain fairly constant throughout working hours or particular shifts. Similarly, packing stations may differ in their capacity, such that a same workload, in terms of number of orders to be handled, for example, may be considered as a high workload in one packing station and as a low or moderate workload in another.

Fulfillment of an order may involve traversal of a plurality of packing stations, whether within a single operation location or multiple ones. For example, a supermarket may comprise various departments, such as dairy products, meat, vegetables, and the like, each of which equipped with a packing post. An order may be fulfilled by moving sequentially from one department to another and adding the respective items in each department to the other items packed thus far. One or more containers, such as crates, boxes, or the like, may be used for packing and shipment of items included in an order. Items may be arranged within a container at a certain order, for example, an item may be placed at the bottom of the crate or higher up. For each container, an item packed therein during a preceding stage, whether in a previous station or earlier at the same packing post, may get a lower position in the container than items packed at a current or subsequent stage. Conversely, an item packed at a deferred stage, whether in a succeeding post or later at the same one, may be positioned higher up in the container than other items packed prior thereto. Similarly, an item packed at a succeeding stage may be susceptible to a shorter period of time spent outside of a regulated environment in which it may be kept. For example, an item may be stored at a controlled temperature, humidity, pressure, or any likewise regulated physical conditions, which may not be maintained during packing or shipping.

In case all packing stations participating in filling of an order are contained in the same premises or within a single compound, a cost of transporting a container from one packing station to another may be negligible. However, in case two or more packing posts are situated in different locations that are spread over a wide area, a cost of a single leg in a route between any one of these locations to another may be significant. Additionally, costs may not be identical when travelling between the same two points in reverse directions, for example, a cost of travelling from A to B may be different than a cost of travelling from B to A, due to traffic constraints or the like. It will be appreciated that transportation costs may be expressed in terms of travel time, distance, energy consumption, or any likewise measures or combinations thereof. Furthermore, the costs may change dynamically over time, for example, higher during rush time or through hard weather conditions, and the like.

A container may have a limited volume, which may not accommodate all items included in an order, or even those intended for packing at a particular location, such as, for example, all products from a same department in a supermarket, as discussed herein. Similarly, a container may be subject to a weight limit, either in addition to or in lieu of a volume limit. A number of containers used for packing and shipment of items in an order, or for packing a subset of these items at a particular station, may affect transportation costs, as a freight capacity of a conveyance vehicle may also be limited, in terms of a total volume, weight, or both. Given a set of items with their respective volumes and/or weights, a minimum number of containers accommodating them may be estimated, using for example techniques of solving what is known in the art as "the bin packing problem".

One technical solution is to determine a division of a set of items included in a customer's order between multiple packing stations, as well as an ordering of these packing stations by which they may be traversed for fulfilling the customer's order. The division and ordering may be colloquially referred to herewith as a packing scheme, packing plan, packing program, packing strategy, packing solution, or the like. Determination of a packing scheme may be based on one or more optimality criteria.

In some exemplary embodiments, the one or more optimality criteria may comprise criteria related to parameters of a supplier, such as a price at which an item is offered by the supplier, availability of an item for purchase from the supplier, and the like. Similarly, with respect to a particular supplier having a plurality of operation locations, the optimality criteria may comprise criteria related to parameters of an operation location of the supplier, such as price or availability of an item at that specific location, where applicable, or any likewise parameters. For example, given two suppliers denoted herewith as supplier A and supplier B, a price of an item may be either higher when purchased from A rather than from B, higher when purchased from B rather than from A, or equal when purchased from either A or B. As another example, an item may be available either from both supplier A and supplier B, only from supplier A, only from supplier B, or from neither one of them. As yet another example, a same supplier may have a plurality of operation locations, where an item may be offered at a same price in all of them or at different prices in some, or it may be available only in some operation locations and not in all of them, e.g. a supermarket chain which some its branches are discount stores and other are regular ones, offering different prices or even stocking different products.

In some exemplary embodiments, the one or more optimality criteria may additionally or alternatively comprise criteria related to parameters of a packing station, such as a type of the packing station, e.g. whether the packing station is automatic, semi-automatic or manual, a workload level of the packing station, or the like.

In some exemplary embodiments, the one or more optimality criteria may additionally or alternatively comprise criteria related to parameters of an item, such as a degree of sensitivity of an item to uncontrolled environment conditions, a degree of sensitivity of an item to weight pressure being put on top thereof, or the like. For example, in case an item requires refrigeration, such as ice cream or yogurt, it may be preferred that this item be packed at a later stage rather than earlier, with respect to other items delivered which may not require refrigeration. Similarly, in case an item is susceptible to get squished or otherwise spoil when being put under pressure, such as tomatoes or strawberries, it may be preferred that this item be put on top within a container in which it is packed and shipped rather than on bottom, and therefore that it be packed at a later stage rather than earlier, either with respect to all items composing an order in its entirety, or a subset thereof being packed in that particular container, wherein several containers are used for fulfilling the order.

In some exemplary embodiments, the one or more optimality criteria may additionally or alternatively comprise criteria related to a whereabouts of an operation location in which a packing station is situated, relative to any whereabouts of other packing stations or a destination location. Preference may be accorded to locations or routes between them which minimize a measure of distance, duration, energy consumption, or any likewise attributable cost of transporting goods from one place to the next in the fulfillment and delivery of an order.

In some exemplary embodiments, the one or more optimality criteria may additionally or alternatively comprise criteria related to collective parameters of a set of items composing an order, or of a particular subset thereof. For example, given respective dimensions of each of which items, such as volume, weight, or the like, then any two or more of those items may be associated with a collective parameter prescribing a number of uniform containers accommodating them.

In some exemplary embodiments, a mathematical formulation as an optimization problem may be employed in order to determine an optimal packing scheme. The optimal packing scheme may be obtained by applying a suitable process of solving the optimization problem thus formulated. A numerical value, such as a monetary cost, for example, may be calculated and used to evaluate desirability of each packing scheme being contemplated.

An illustrative example of a mathematical formulation which may be used in determining a packing scheme in accordance with the disclosed subject matter is discussed herein. In an exemplary scenario contemplated, a first packing station S may be located in a first operation location of a first supplier, such as, for example, a first supermarket, denoted herewith as A, and a second packing station S' may be located in a second operation location belonging to a second supplier, for example, a second supermarket, denoted herewith as B. An order, denoted herewith as X, may be received from a customer and comprise a set of items $\{x_1, x_2, \ldots, x_n\}$. It will be appreciated that one objective the disclosed subject matter is aimed at is posing a mathematical problem, where a solution thereto provides a plan according to which the order X may be efficiently fulfilled and delivered to its destination. It will be further appreciated that the solution involves making two decisions which depend on each other: 1) which item is packed in which packing station? 2) in which order the packing stations are traversed?

Without loss of generality, assuming that supermarket A is chosen as a starting point, the plan may be put in the following exemplary form:

1. In packing station S at supermarket A, pack the items $x_{i_1}, \ldots, x_{i_k}$ from X in a container, where $i_j \in \{1, \ldots, n\}$ and $0 \leq k \leq n$;
2. Transport the container to packing station S' in supermarket B;
3. Add items $x_{i_{k+1}}, \ldots, x_{i_n}$ from X;
4. Transport the container to the destination.

An exemplary cost function for packing an item x of X in packing station S of supermarket A may be assigned as follows:
   a. Cost of item x in currency, such as a price at which item x is sold in A, e.g. $1.25 or the like. In case item x is unavailable for purchase in A, a value which commensurate with an infinite cost may be used, such as a maximum positive value for an integer admitted by variables in a suitable computing environment. Alternatively, a Boolean variable may be used to denote availability of item x in A;
   b. Cost of packing item x at an earlier stage of the order fulfillment process, such that it is placed at the bottom part of the container rather than at the top part. For hard or resilient items, the cost may be zero, while for tender items the cost may be proportional to a degree of their sensitivity to exertion of force thereon, therefore giving rise to a stronger preference for putting these items on top, e.g. a higher cost for tomatoes than for apples, or the like;
   c. Cost of packing item x at an earlier stage of the order fulfillment process, such that it gets to spend a longer period of time outside of a controlled environment than it would have had if packed at a later stage. For example, for items requiring refrigeration, such as ice cream or the like, the cost may be proportional to a measure of time elapsed from packing and until delivery to the destination, e.g. a duration of travel from supermarket A to supermarket B, and then from the latter to the delivery destination, in the illustrative example discussed herein. As for items which do not require such regulated conditions, the cost may be zero;
   d. Cost of packing item x in packing station S of supermarket A. The cost may be proportional to a level of workload on S, e.g. a low or zero cost in case of a low workload or none, and a higher cost the higher the workload is. Additionally or alternatively, the cost may be commensurate with a likelihood of causing damage to the item x during packing thereof at S, or infinite if item x cannot be packed in S, for example if item x is a pound of tomatoes and S is a robotic packing station unable of handling vegetables. In the latter case, item x may be treated as if being unavailable, using a Boolean variable similarly as discussed herein.

Similarly, a cost function for packing item x of order X in packing station S' of supermarket B may be assigned in the same manner, as well as for any other item x' of X. It will be appreciated that in case the two packing stations S and S' are in the same supermarket, i.e. A=B, then the monetary cost of item x is the same. This may also be true if A and B are not the same supermarket but belong to the same packing chain, or it may be true in case item x is subject to price regulation, or even just by chance.

The packed items of order X may be shipped from either one of stations S and S' to the recipient, denoted herewith as customer C. It will be appreciated that, while a customer placing an order and a recipient thereof may be two different entities, in the context of the present disclosure, however, for the sake of simplicity and ease of discussion, these may be treated as being the same entity.

When deciding on an ordering between S and S', the following options may be available: S→S'→C, or S'→S→C. The travel from S to S' may take certain amount of time, and so from S' to S, which may likely be over a similar distance but availability of transport, for example, may be different. Similarly, a travel from S' to customer C, as well as from S to C, may each be associated with a time duration required therefor. In case S and S' are in the same supermarket the amount of time for travelling therebetween may be very small. Additional factors affecting timing and costs may include, for example, availability constraints of delivery vehicles, time windows during which deliveries from supermarket A or supermarket B may be made to the address of customer C, in accordance with allotted distribution regions, or the like.

An exemplary timing for each section in an optional route traversing packing stations S and S' located in different supermarkets, along with respective associated costs, may be as follows:
(i) S→S': 20 minutes, with cost Y'''
(ii) S'→S: 60 minutes, with cost Y''
(iii) S→C: 40 minutes, with cost Y
(iv) S'→C: 90 minutes, with cost Y'

As can readily be apparent the route S→S'→C is much slower in such case than the alternative of S'→S→C.

A total cost of packing and delivery in accordance with a given plan may be calculated as a sum of a total cost of packing each of the items in the respective packing station assigned to it (referred to herewith simply as the cost of the item), and a total cost of traveling in a respective route traversing the packing stations in the assigned order, i.e.:

$$\text{Total cost} = \Sigma_{x \in X} \text{ cost of item } x + \text{total cost of travel}.$$

For example, in an illustrative scenario as presented herein, a total cost of a plan starting in packing station S at supermarket A may be calculated as the sum:

$$\sum_{j=1}^{k} \text{cost of item } x_{i_j} + \sum_{l=k+1}^{n} \text{cost of item } x_{i_l} + Y'' + Y$$

wherein items $x_{i_1}, \ldots, x_{i_k}$ are packed in S, items $x_{i_{k+1}}, \ldots, x_{i_n}$ are packed in S', and the associated costs are calculated accordingly under a premise that the former are packed prior to the latter.

It will be appreciated that an exemplary mathematical formulation as disclosed herein may be translated into a combinatorial optimization problem, which in turn may be solved using standard methods, such as linear programming, least squares, or the like.

As an illustrative example, a set of indicator variables I(item $x_i$ packed in station $S_j) \in \{0,1\}$ for each item $x_i$ in order X and packing station $S_j \in \{S, S'\}$ may be defined. Without loss of generality, packing station S may be denoted as $S_1$ and packing station S' as $S_2$. Using an abbreviated form $I_i^j$ of the indicator variable denoting that item $x_i$ is packed at station $S_j$, a system of linear equations or constraints may be defined as follows:

$$I_i^1 + I_i^2 = 1,$$

$$I_i^j \geq 0,$$

An objective function may be defined as a product of a vector $\vec{c}$ and a vector $\vec{\alpha}$ wherein coordinate $c_i$ is a cost of packing item $x_i$ at station $S_1$, coordinate $c_{i+n}$ is a cost of packing item $x_i$ at station $S_2$, coordinate $\alpha_i$ is indicator variable $I_i^1$, and coordinate $\alpha_{i+n}$ is variable $I_i^2$, for example. Thus a corresponding optimization problem may be formulated as follows:

$$\min(\vec{c}\cdot\vec{\alpha}), \text{ s. t. } \forall i, \alpha_i+\alpha_{i+n}=1, \alpha_i\geq 0.$$

In some exemplary embodiments, vector $\vec{c}$ may be calculated based on a predetermined ordering of packing stations $\{S_1, S_2\}$. The ordering may be chosen such that a total cost of travel between one packing station to the next and then to the customer C is minimized. Alternatively, for each possible route, a corresponding vector $\vec{c}$ may be modified accordingly per the induced ordering, whereby giving rise to a set of respective conditioned optimization problems. Each of the conditioned problems may be solved separately to obtain a partition of the items by which a total cost of packing and delivery may be minimized with respect to the particular route. Given a set of possible conditioned solutions, a one that brings the total cost to an overall minimum amongst the set members may be selected as the solution to the original, unconditioned problem. In accordance with yet another alternative, the cost vector $\vec{c}$ and Boolean vector $\vec{\alpha}$ may be augmented to include costs for both optional orderings and respective indicator variables $I_j$ denoting whether $S_j$ is visited first or second. The system of equations may accordingly be augmented with constraints: $I_1+I_2=1$, $I_j\geq 0$. It will be appreciated however that in this case the resulting objective function may no longer be linear, but rather may comprise a bilinear expression, e.g. a cost of item $x_i$ may be given as the sum:

$$\Sigma_{j\in\{1,2\}} c_{ij}^1\cdot I_1\cdot I_i^j + c_{ij}^2\cdot I_2\cdot I_i^j,$$

wherein $c_{ij}^1$ and $c_{ij}^2$ are the respective costs of packing item $x_i$ in station $S_j$, either when the travel starts at station $S_1$ or conversely when it starts at station $S_2$.

It will be appreciated that while the illustrative exemplary mathematical formulation discussed herein is exemplified with respect to two packing stations, the disclosed subject matter is not meant to be limited in such manner, and the approach presented herein may be similarly extended to any arbitrary number of packing stations, whether situated in a same operation location or in several operation locations distinct from one another. For example, in case of three packing stations $\{S_1, S_2, S_3\}$, for example, there may be 3!=6 possible routes of the form $S_j \to S_k \to S_l \to C$ for consideration, and respective indicator variables, constraints and costs may be added accordingly. A cost associated with an item may be adjusted to account for a relative place in line of a packing station in question. For example, with respect to tender items, a cost of packing any one of these items at a given station may be weighted in accordance with its place in line, i.e. a higher weight may be ascribed the earlier the station being visited along the route, and vice versa. Similarly, with respect to sensitive items requiring regulated environment conditions, a cost of packing each of which items at certain station may be based on a summation of the travel times from that station to subsequent ones and then to the destination.

In some exemplary embodiments, packing of an item may be deferred to a later stage with respect to other items being packed at the same station. For example, an item which requires refrigeration may be assigned to a later packing station, and further may be packed subsequently to the rest of the items assigned to that station. It will be appreciated that a cost function as disclosed herein may be similarly utilized or adapted accordingly to prioritize later packing of tender or sensitive items within a same station, such as may be done for prioritizing late packing thereof among two or more successive stations.

As another illustrative example, multiple packing stations may be posted in a single operation location, which may be automated in full or in part, e.g. a robotic supermarket or the like. Some of the stations may be limited to a subset of the products, while other stations may be able to handle all products, for example, some of the stations may be robotic and limited to handling only certain products, and a remainder of the stations may be human operated and able to handle any product. It may be desirable to defer as great an amount of work as possible to robotic packing stations over human operated ones, even in case of an order containing one or more products that cannot be handled by robotic stations. This preference may be based on considerations such as, for example, that there may be fewer human operated packing posts than robotic ones to begin with, or there may be even only one such station, and thus it may be desired to reduce the load on those stations as much as possible. It will be appreciated that costs incurred in use of robots are expected to be significantly lower in comparison to humans, thus it may be desired to have as much as possible work done by them.

An optimal packing scheme in such a scenario may be as follows: for every item x in order X that the robotic packing station can handle, the item x may be assigned to be packed at the robotic packing station. The subset of items being packed in the robotic stations may be automatically picked and delivered to the packing stations in ordering that defers more tender items to later in line, so that they may be placed higher in the crate, or likewise container used. Once the items that can be handled automatically are packed, the crate may be moved from the robotic packing station to the human operated packing station for adding the remaining items therein. It will be appreciated that using the robotic station at the earlier part and the human operated one at the later part may be expected to be more cost efficient than the opposite order, as items that are tender may typically be those which are more difficult or even impossible to be handled by robotic stations, thus it may be desired in any event to pack these items at the later part, so that they me be put on top.

In some exemplary embodiments, an ordering of packing stations in a packing scheme may comprise multiple routes between the packing stations and destination. For example, instead of using a single route wherein packing stations are traversed one after another and items are added cumulatively and shipped to a destination from a packing station being last in line, it may be preferable to pack each subset of items in an assigned station and transport them to the destination independently of one another. Additionally or alternatively, a cost of transportation to a destination may vary among different packing stations, such that it may be preferable to pack a subset of items at one station and transport them to the destination from another, at the additional cost of inter station transportation.

As an illustrative example, an order X of a customer may require more than one container, e.g. two crates, for packing all items x in X. One optional packing scheme may be as follows:

1. In packing station S at supermarket A, pack the items $x_{i_1}, \ldots, x_{i_k}$ from X in a first crate;
2. Transport the first container to packing station S' in supermarket B;
3. In packing station S' at supermarket B, pack the items $x_{i_{k+1}}, \ldots, x_{i_n}$ from X in a second crate;

4. Transport the first and second crates to the destination.

Another optional packing scheme may be as follows:
1. In packing station S at supermarket A, pack the items $x_{i_1}, \ldots, x_{i_k}$ from X in first a crate;
2. Transport the first crate to the destination;
3. In packing station S' at supermarket B, pack the items $x_{i_{k+1}}, \ldots, x_{i_n}$ from X in a second crate;
4. Transport the second crate to the destination.

Given these two alternative packing schemes, the one which minimizes a total cost of delivery may be chosen therefrom as the preferred solution. It will be appreciated that even in case all items may be delivered in a single container, any one of these alternatives may still be preferable to a solution wherein a same container is transported between stations and all items are packed therein. Thus, the three options may be compared with one another and a packing scheme being the most cost efficient among them may be selected.

The approach disclosed herein of dividing delivery among multiple containers and transporting them successively or concurrently may be generalized to any number of packing stations or containers involved. For example, in case of 2 packing stations, there may be two optional routes inducing a total order, i.e., $S_1 \rightarrow S_2 \rightarrow C$ and $S_2 \rightarrow S_1 \rightarrow C$, wherein either one or two containers may be used and transported to a customer C from the same final packing station on the route. In addition, there may be one optional route inducing a partial order, $S_1 \rightarrow C$; $S_2 \rightarrow C$, wherein two containers may be used and transported to the customer C, each of which from a different station. Similarly, in case of 3 packing stations, there may be an overall number of 13 optional routes in total, as follows: 3!=6 total order routes in a form of $S_j \rightarrow S_k \rightarrow S_l \rightarrow C$, wherein either one, two, or three containers in total may be used along the route and transported all from $S_l$, being last in line; 3*2=6 partial order routes in a form of $S_j \rightarrow C$; $S_k \rightarrow S_l \rightarrow C$, wherein a first container may be used at $S_j$, and additional one or two containers may be used at $S_k$ and $S_l$ respectively, and transported eventually from $S_l$; and one partial order route in a form of $S_j \rightarrow C$; $S_k \rightarrow C$; $S_l \rightarrow C$, wherein three containers may be used, each of which transported from a different station.

In some exemplary embodiments, additional or alternative split transportation options may be considered and an optimal one may be chosen accordingly, such as, for example, using a first container in one station, a second container in another station, and transporting both the first and second containers to a third station and from then on to the customer, wherein at the third station items may optionally be added either to the first or second container, packed in a third container, or the like. In more general terms, instead of shipping a container directly to the customer once all items assigned to the container are packed, the container may be shipped indirectly, via a different packing station than the one in which the packing finished. For example, a partial order route in a form of $S_j \rightarrow S_k \rightarrow C$; $S_k \rightarrow S_l \rightarrow C$ may be found as most cost efficient.

One technical effect of utilizing the disclosed subject matter is to provide an improvement upon pre-existing techniques for packing and transporting goods, where only a single provider and a single packing point are typically employed in fulfillment and shipping of a customer's order. Under conventional approaches of this sort, items may be picked and brought to a packing post without any organizing rules or logic, where they may be placed haphazardly and packed manually, with same lacking order or guidance. Accordingly, a decision on placement of an item in a certain position in a package may be made by applying an ad hoc discretion or intuitively, possibly leading to sub-optimal results. A time elapsed from when an item is first picked and brought to the packing point and until it is actually placed in the package and shipped away may be prolonged, thus exposing sensitive items to spoilage or deterioration. In contrast, the disclosed subject matter may be employed to alleviate these difficulties and disadvantages of existing approaches, while streamlining and making the packing process and its results more efficient. It will further be appreciated that the disclosed subject matter may contribute to reducing a likelihood of damage incurred during the packing and delivery process, which in turn may bring to a decrease in returns and compensation claims, along with their associated processing costs.

Another technical effect of utilizing the disclosed subject matter is to facilitate automatic performance of a function which previously could only be performed manually by humans. In particular, the disclosed subject matter may be employed for automating packing and delivery of goods wherein robotic packing stations are charged with the task of picking items, packing and transporting them to a destination at an optimal manner, such that involvement of humans in the process may be reduced to a minimum or even be eliminated entirely.

It will be appreciated that the disclosed subject matter may provide for one or more technical improvements over any pre-existing technique and any technique that has previously become routine or conventional in the art. Additional technical problems, solutions and effects may be apparent to a person of ordinary skill in the art in view of the present disclosure.

Figure 1:
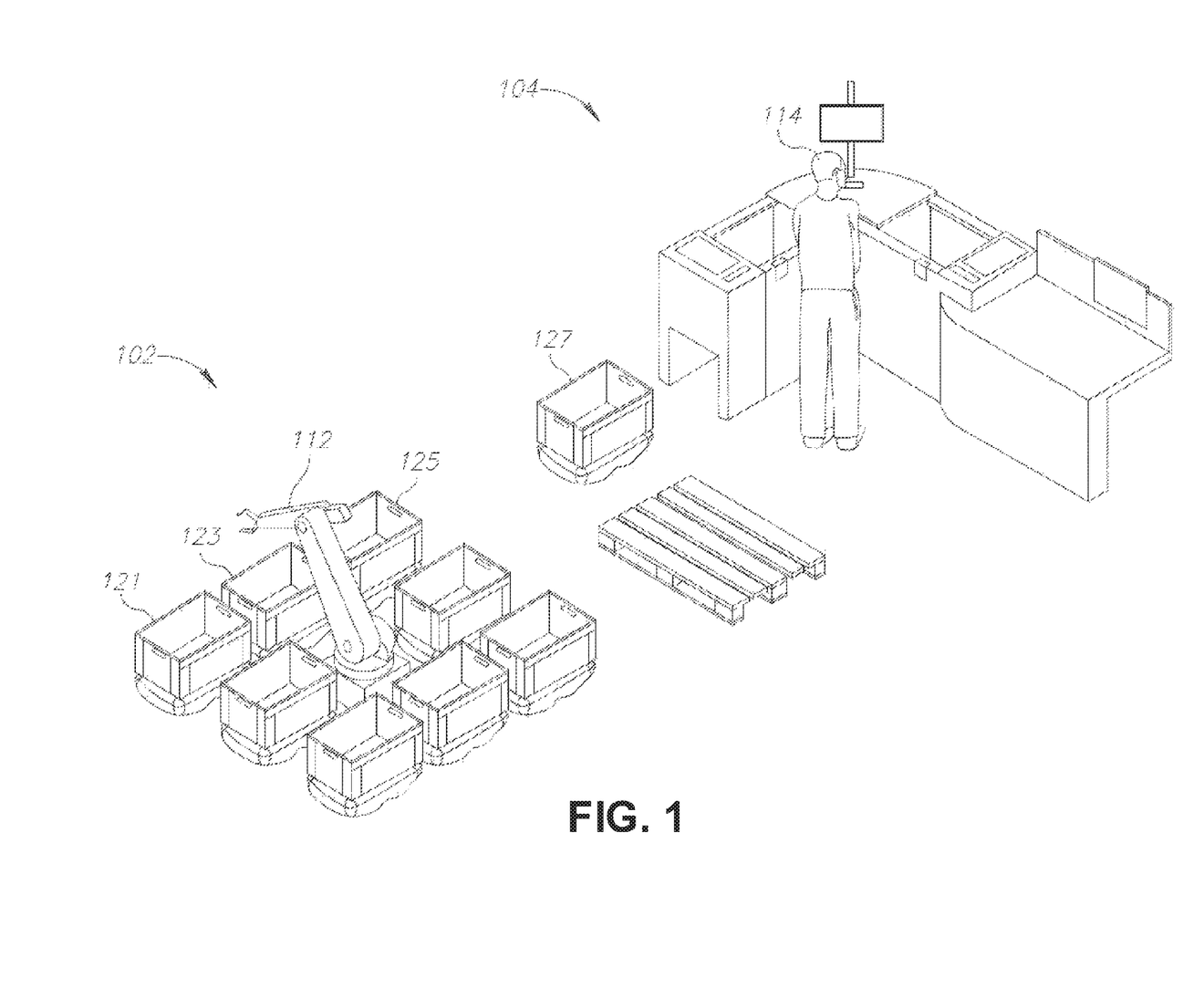
FIG. 1 shows a schematic illustration of an exemplary environment and architecture in which the disclosed subject matter may be utilized, in accordance with some exemplary embodiments of the disclosed subject matter.

Referring now to FIG. 1 showing a schematic illustration of an exemplary environment and architecture in which the disclosed subject matter may be utilized, in accordance with some exemplary embodiments of the disclosed subject matter.

In an operation location where goods are stored and marketed therefrom, such as, for example, a warehouse, a distribution station, a retail store, or the like, one or more robotic packing stations, such as Station 102, and one or more manned packing stations, such as Station 104, may be set for handling packing of items for delivery to customers. Station 102 may accommodate a robotic Arm 112, capable of picking items up and placing them down at desired locations. Arm 112 may be configured to work in concert with one or more movable containers, such as Crates 121 to 127. One or more of these containers may be used to accommodate items packed for delivery, while other may be used for picking up and stocking items intended to be packed from shelves or likewise storing area where inventory is kept. Station 104 may accommodate one or more persons, such as Worker 114, charged with the task of packing. Station 104 may be either completely manual or semi-automated, for example, it may be able to receive containers such as Crates 121 to 127 and lift them automatically to a waist level of a person such as Worker 114, thereby making the packing task easier for Worker 114. A process of fulfilling an order may begin at Station 102, wherein all items which Arm 112 is able to handle may be being packed for example in Crate 125. Once the task of packing all items assigned to Station 102 is completed, Crate 125 may be forwarded to Station 104 wherein a remainder of items may be packed, such as Crate 127 may have been moved towards Station 104 prior thereto, as exemplified in FIG. 1. Crate 123 may be similarly moved and take the former place of Crate 125, and so forth.

In some exemplary embodiments, in case the operation location comprises multiple robotic stations such as Station 102, a hub configuration may be utilized, wherein a human operated station such as Station 104 may be located amongst the robotic stations to reduce expected travel between stations. Additionally or alternatively, deployment of the packing stations may be such that an exit from the operation location is situated in closer proximity to a manned station than to a robotic one, as a route in which an order proceeds from a robotic station to a manned station, and then outside, may be more common than others. It will be appreciated that one way or another, a robotic and a manned packing station may work in conjunction as shown and exemplified in FIG. 1.

Figure 2:
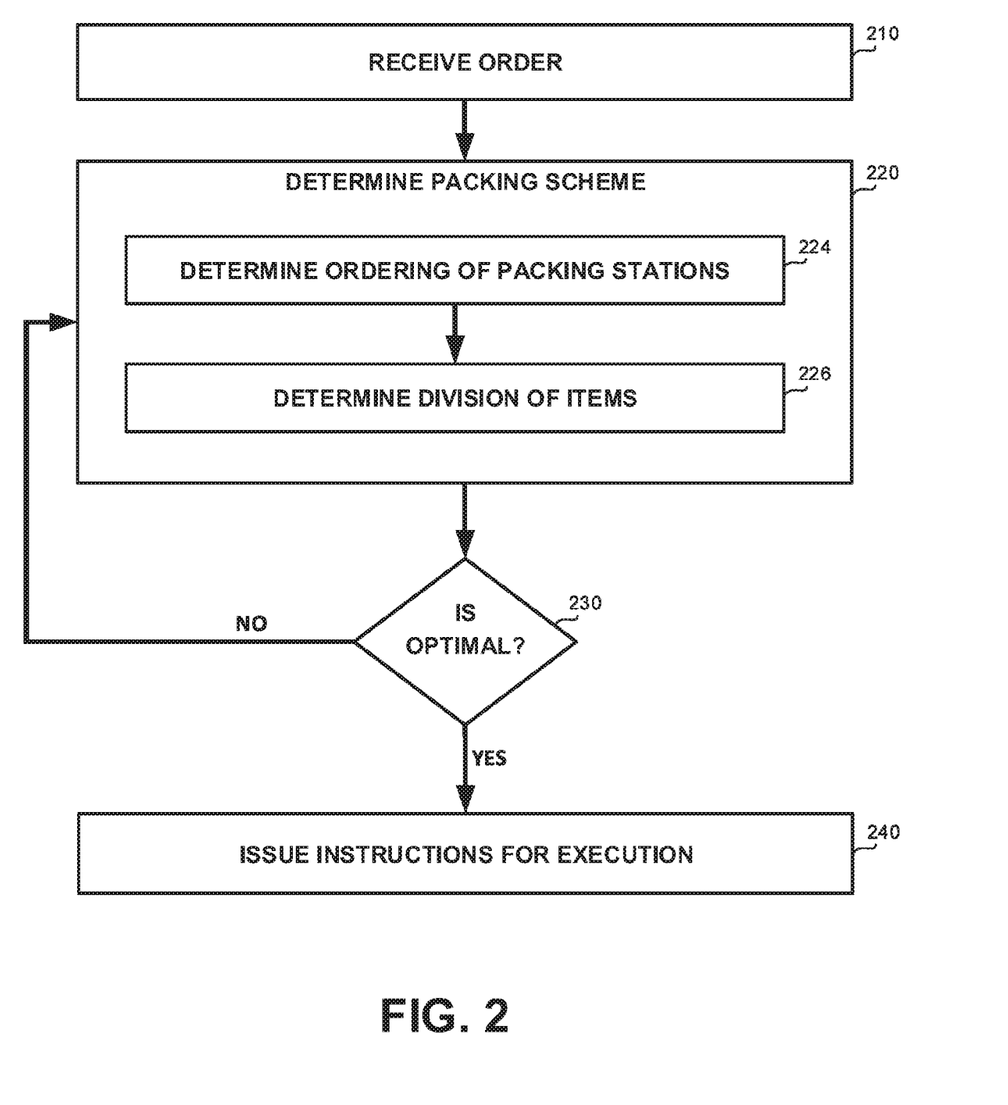
FIG. 2 shows a flowchart diagram of a method, in accordance with some exemplary embodiments of the disclosed subject matter.

Referring now to FIG. 2 showing a flowchart diagram of a method, in accordance with some exemplary embodiments of the disclosed subject matter.

On Step 210, an order X from a customer may be received. The order X may specify a set of items $\{x_1, \ldots, x_n\}$ and a shipment address. The items may be available from one or more suppliers having one or more operation locations, wherein some items may be available from one supplier or at one operation location only, while other items may be available from multiple suppliers or at multiple locations thereof. At each operation location there may be one or more packing stations, wherein for each item available at the operation location, there may exist at least one packing station able to handle packing thereof. Fulfillment of the order X may be performed using a plurality of packing stations, whether all of which being located at a same operation location, or spread over two or more different locations. The packing stations may be of a same type or different ones, have a universal or limited functionality, be subject to certain workloads, or the like.

On Step 220, a packing scheme for fulfilling the order X received in Step 210 may be determined. The packing scheme may comprise a division of the set of items $\{x_1, \ldots, x_n\}$ into one or more subsets, each of which assigned to one of the plurality of packing stations, and an ordering of the one or more packing stations by which items of the respective subsets are to be packed and delivered to the shipment address. Additionally or alternatively, the packing scheme may comprise an ordering of the items in a subset, by which the items are to be packed within an assigned packing station. In some exemplary embodiments, a plurality of containers may be used for transporting the set of items to the shipment address, in which case the packing scheme may comprise for each of the one or more subsets an assigned container of the plurality of containers and a transportation route of the assigned container.

The packing scheme may be determined in Step 220 based on one or more optimality criteria. The one or more optimality criteria may be selected from the group consisting of: criteria related to a supplier or an operation location thereof; criteria related to a packing station; criteria related to an item; criteria related to a measure of transportation costs; and, any combination thereof.

In some exemplary embodiments, the set of items may be packed and transported within containers of a limited dimension, in which case the one or more optimality criteria may comprise a criterion of a number of containers required for packing a respective portion of the set of items in a subset.

In some exemplary embodiments, an ordering of the plurality of packing stations may be determined on Step 224. The ordering may be determined based on a measure of transportation costs over a delivery route traversing the packing stations according to the ordering. The costs may be updated dynamically, based for example on traffic conditions or the like. The ordering may be chosen so as to minimize a total of associated transportation costs of one or more containers required for delivering the set of items. In some exemplary embodiments, the ordering may be either a total order by which all packing stations may be traversed in a single sequence, or a partial order wherein some subsets are packed in succession and others are packed in parallel and delivered separately. In some exemplary embodiments, any and all optional routes may be enumerated and compared with one another to determine an optimal ordering by which transportation costs may be minimized.

In some exemplary embodiments, a division of the set of items $\{x_1, \ldots, x_n\}$ among the plurality of packing stations may be determined on Step 226. The division may be determined based on a cost function assigned to each item of the set with respect to each one of the plurality of packing stations. The cost function may depend on the ordering of the plurality of packing stations determined on Step 224. The cost function may be determined or adjusted dynamically, such as, for example, depending on a current workload at a packing station at hand, or the like. In some exemplary embodiments, a mathematical formulation as a combinatorial optimization problem may be employed. The optimization problem may be solved using any one of available standard techniques.

In some exemplary embodiments, Step 220 may further comprise, given the ordering of packing stations determined in Step 224 and division of items determined in Step 226, determining an assignment of each subset to one of a plurality of containers and a transportation route therefor. Additionally or alternatively, Step 220 may further comprise determining an ordering of packing each of the respective items of at least one subset within the packing station assigned thereto.

On Step 230, the packing scheme determined on Step 220 may be checked as to whether the one or more optimality criteria are being met thereby, and, if so, the process may proceed to Step 240. Otherwise, Step 220 may be repeated in order to determine a different packing scheme, such as, for example, by determining a different ordering in Step 224, determining a different division in Step 226, or both. Additionally or alternatively, a different assignment into one or more containers or different transportation route of any one of which containers may be determined. In some exemplary embodiments, the packing scheme at hand may be compared with one or more previously determined packing schemes, and the one determined to be most desirable with respect to the optimality criteria may be chosen.

On Step 240, responsive to determining in Step 230 that the one or more optimality criteria are satisfied by the packing scheme determined in Step 220, instructions for executing the order may be issued accordingly. For example, in case of a robotic supermarket with several robotic packing stations and a human operated one, such as exemplified in FIG. 1, instructions may be issued for picking items and bringing them to a chosen robotic station in a particular order, by which they may also be placed in a crate. Further instructions may then be issued for moving the crate to the human operated station, and for picking a remainder of items and bringing those to the human operated station to be packed and added to the crate. Additional instructions may be issued for transporting the crate to the destination or to subsequent locations. In some exemplary embodiments, transportation may be effected through automatic means via issuance of corresponding instructions, such as, for example, instructions for loading the crate onto an autonomous vehicle, unmanned aircraft, or the like.

Figure 3:
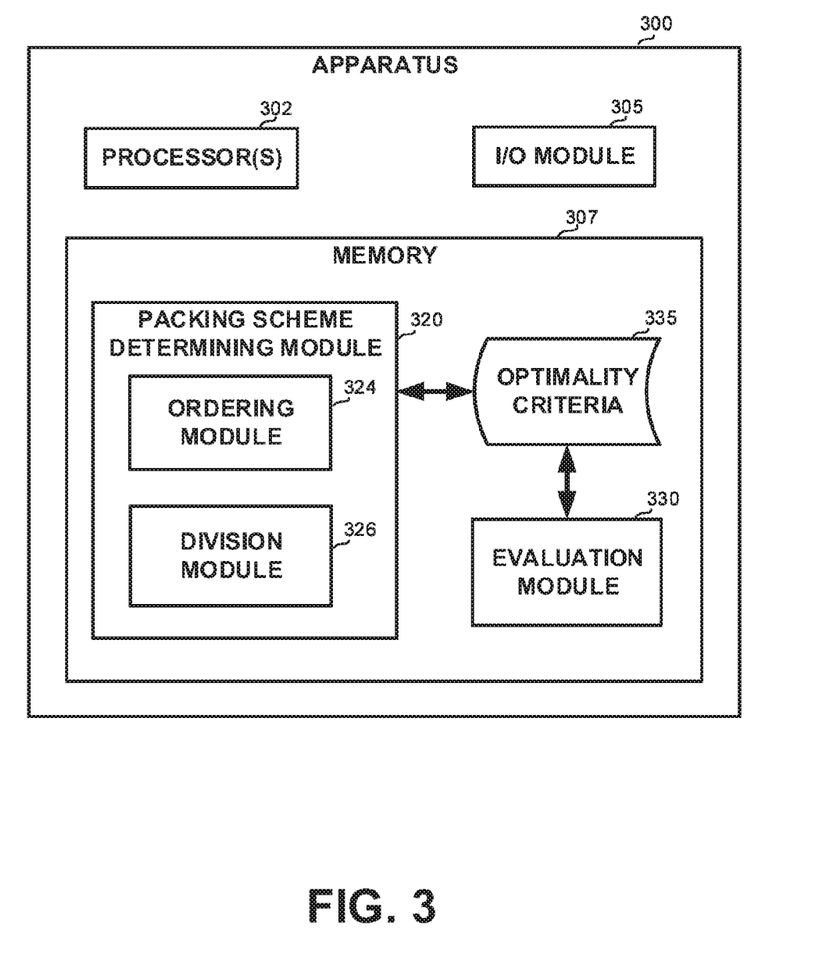
FIG. 3 shows a block diagram of an apparatus, in accordance with some exemplary embodiments of the disclosed subject matter.

Referring now to FIG. 3 showing a block diagram of an apparatus, in accordance with some exemplary embodiments of the disclosed subject matter. An Apparatus 300 may be configured to support parallel user interaction with a real world physical system and a digital representation thereof, in accordance with the disclosed subject matter.

In some exemplary embodiments, Apparatus 300 may comprise one or more Processor(s) 302. Processor 302 may be a Central Processing Unit (CPU), a microprocessor, an electronic circuit, an Integrated Circuit (IC) or the like. Processor 302 may be utilized to perform computations required by Apparatus 300 or any of it subcomponents.

In some exemplary embodiments of the disclosed subject matter, Apparatus 300 may comprise an Input/Output (I/O) module 305. I/O Module 305 may be utilized to provide an output to and receive input from a user, such as, for example, receiving an order from a customer, issuing instructions for executing an order in accordance with a determined packing scheme, or the like.

In some exemplary embodiments, Apparatus 300 may comprise Memory 307. Memory 307 may be a hard disk drive, a Flash disk, a Random Access Memory (RAM), a memory chip, or the like. In some exemplary embodiments, Memory 307 may retain program code operative to cause Processor 302 to perform acts associated with any of the subcomponents of Apparatus 300.

Packing Scheme Determining Module 320 may be configured to determine a packing scheme for packing and delivery of a set of items included in an order received from a customer, similarly as in Step 220 of FIG. 2. Packing Scheme Determining Module 320 may be configured to determine the packing scheme based on one or more Optimality Criteria 335. In some exemplary embodiments, Packing Scheme Determining Module 320 may be configured to assign costs for each ordering of a plurality of packing stations traversed in a delivery route and for each division of the set of items among the plurality of packing stations, and to apply an optimization problem solving process to obtain a packing scheme whereby a total cost of executing the order is minimized. In some exemplary embodiments, Packing Scheme Determining Module 320 may be further configured to determine an ordering by which items are to be packed within a same packing station.

Ordering Module 324 may be configured for determining an ordering of the plurality of packing stations by which a customer's order may be fulfilled, similarly as in Step 224 of FIG. 2. Ordering Module 324 may be configured to assign a cost for each section of possible transportation routes, and determine a route by which a total cost of transportation may be minimized. In some exemplary embodiments, the ordering determined by Ordering Module 324 may be a total order or a partial one, wherein a plurality of containers may be used for delivering the order.

Division Module 326 may be configured for determining a division of a set of items in a customer's order to a plurality of packing stations, similarly as in Step 226 of FIG. 2. Division Module 326 may be configured to assign a cost for packing each item at any one of the packing stations, and determine a division of the set of items to one or more subsets each of which being packed at a respective packing stations, such that a total cost of packing the set of items may be minimized. In some exemplary embodiments, Division Module 326 may be configured to assign the cost based on an ordering of the plurality of packing stations determined by Ordering Module 324.

Evaluation Module 330 may be configured to determine whether the one or more Optimality Criteria 335 are met by a packing scheme determined by Packing Scheme Determining Module 320. Optimality Criteria 335 being evaluated by Evaluation Module 330 may comprise criteria related to a supplier or an operation location thereof, such as prices and availability of items in an order, criteria related to a packing station, such as type, functionality, or workload level, criteria related to an item, such as hardness or sensitivity, criteria related to a measure of transportation costs, or the like.

In some exemplary embodiments, Optimality Criteria 335 may comprise criteria related to collective parameters of a set of items composing an order, or of a particular subset thereof, such as, for example, a minimum number of uniform containers of a limited dimensions accommodating those items. Evaluation Module 330 may be configured to determine accordingly satisfaction of such criteria by a packing scheme determined by Packing Scheme Determining Module 320.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method comprising:
receiving a customer order indicating a set of items for delivery to a destination, wherein the set of items are to be packed and transported within containers of a limited dimension;
determining a packing scheme for packing the set of items based on one or more optimality criteria, wherein the one or more optimality criteria comprises a first criterion related to a parameter of the set of items and a second criterion of a number of containers required for packing a respective portion of the set of items in a subset, the packing scheme comprising a division of the set of items between two or more packing stations situated in one or more operation locations of one or more suppliers, the division defining an assignment of two or more subsets of the set of items to the two or more packing stations, respectively, the two or more subsets being mutually disjoint, wherein the two or more packing stations comprise two or more robotic packing stations, the packing scheme further comprising a sequential order of packing the two or more subsets of the set of items at the two or more packing stations paired therewith, wherein the packing scheme determines that packing of the set of items and transporting thereof to the destination is to be performed according to the sequential order, wherein the sequential order of packing is determined based on the parameter of the set of items, wherein the parameter comprises degrees of sensitivity of the two or more subsets to exertion of force thereon, wherein in each packing station paired with a subset of the two or more subsets, a respective portion of the set of items in the subset is to be packed and transported from the packing station to the destination or to a subsequent packing station, wherein the subsequent packing station is defined by the sequential order of packing; and, responsive to determining that the one or more optimality criteria are satisfied by the packing scheme, packing the set of items according to the packing scheme, wherein said packing comprises the two or more robotic packing stations automatically executing the customer order according to the sequential order of packing.

2. The method of claim 1, wherein the one or more optimality criteria comprise a third criterion related to a second parameter, wherein the second parameter comprises a degree of sensitivity of an item to temperatures at the two or more packing stations, wherein the sequential order of packing is determined based on the second parameter.

3. The method of claim 1, wherein said determining the packing scheme comprises: for each packing station of the two or more packing stations, assigning to each item of the set of items a cost for packing the item at the packing station in accordance with a predetermined ordering; and, applying an optimization problem solving process to obtain the packing scheme, wherein the optimization problem solving process is configured to select the sequential order based on minimizing a total cost of executing the customer order.

4. The method of claim 1, wherein said determining the packing scheme comprises: assigning a cost for each route section from a packing station to the destination and from the packing station to another packing station; and, determining the sequential order of the packing stations such that a total cost of an overall route corresponding thereto is minimized.

5. The method of claim 1, wherein the packing scheme comprising a division of the set of items between three or more packing stations.

6. The method of claim 1, wherein the packing scheme further comprises, for the subset of the two or more subsets, an internal sequential order by which items of the subset are to be packed in the packing station paired therewith.

7. The method of claim 1, wherein the one or more optimality criteria comprise a third criterion related to a second parameter, wherein the second parameter comprises transportation costs of transporting an item between the two or more packing stations, wherein the sequential order of packing is determined based on the second parameter.

8. The method of claim 1, wherein the containers are used for transporting the set of items, wherein the packing scheme comprises, for each of the two or more subsets, an assigned container of the containers.

9. An apparatus comprising a processor and coupled memory, the processor being adapted to perform the steps of:

receiving a customer order indicating a set of items for delivery to a destination, wherein the set of items are to be packed and transported within containers of a limited dimension;

determining a packing scheme for packing the set of items based on one or more optimality criteria, wherein the one or more optimality criteria comprises a first criterion related to a parameter of the set of items and a second criterion of a number of containers required for packing a respective portion of the set of items in a subset, the packing scheme comprising a division of the set of items between two or more packing stations situated in one or more operation locations of one or more suppliers, the division defining an assignment of two or more subsets of the set of items to the two or more packing stations, respectively, the two or more subsets being mutually disjoint, wherein the two or more packing stations comprise two or more robotic packing stations, the packing scheme further comprising a sequential order of packing the two or more subsets of the set of items at the two or more packing stations paired therewith, wherein the packing scheme determines that packing of the set of items and transporting thereof to the destination is to be performed according to the sequential order, wherein the sequential order of packing is determined based on the parameter of the set of items, wherein the parameter comprises degrees of sensitivity of the two or more subsets to exertion of force thereon, wherein in each packing station paired with a subset of the two or more subsets, a respective portion of the set of items in the subset is to be packed and transported from the packing station to the destination or to a subsequent packing station, wherein the subsequent packing station is defined by the sequential order of packing; and, responsive to determining that the one or more optimality criteria are satisfied by the packing scheme, packing the set of items according to the packing scheme, wherein said packing comprises the two or more robotic packing stations automatically executing the customer order according to the sequential order of packing.

10. The apparatus of claim 9, wherein the one or more optimality criteria comprise a third criterion related to a second parameter, wherein the second parameter comprises a degree of sensitivity of an item to temperatures at the two or more packing stations, wherein the sequential order of packing is determined based on the second parameter.

11. The apparatus of claim 9, wherein said determining the packing scheme comprises: for each packing station of the two or more packing stations, assigning to each item of the set of items a cost for packing the item at the packing station in accordance with a predetermined ordering; and, applying an optimization problem solving process to obtain a packing scheme, wherein the optimization problem solving process is configured to select the sequential order based on minimizing a total cost of executing the customer order.

12. The apparatus of claim 9, wherein said determining the packing scheme comprises: assigning a cost for each route section from a packing station to the destination and from the packing station to another packing station; and, determining the sequential order of the packing stations such that a total cost of an overall route corresponding thereto is minimized.

13. The apparatus of claim 9, wherein the packing scheme comprising a division of the set of items between three or more packing stations.

14. The apparatus of claim 9, wherein the packing scheme further comprises, for the subset of the two or more subsets, an internal sequential order by which items of the subset are to be packed in the packing station paired therewith.

15. The apparatus of claim 9, wherein the one or more optimality criteria comprise a third criterion related to a second parameter, wherein the second parameter comprises transportation costs of transporting an item between the two or more packing stations, wherein the sequential order of packing is determined based on the second parameter.

16. The apparatus of claim 9, wherein the containers are used for transporting the set of items, wherein the packing scheme comprises for each of the two or more subsets, an assigned container of the containers.

17. A non-transitory computer readable storage medium retaining program instructions, which program instructions when read by a processor, cause the processor to perform a method comprising:

receiving a customer order indicating a set of items for delivery to a destination, wherein the set of items are to be packed and transported within containers of a limited dimension;

determining a packing scheme for packing the set of items based on one or more optimality criteria, wherein the one or more optimality criteria comprises a first criterion related to a parameter of the set of items and a second criterion of a number of containers required for packing a respective portion of the set of items in a subset, the packing scheme comprising a division of the set of items between two or more packing stations situated in one or more operation locations of one or more suppliers, the division defining an assignment of two or more subsets of the set of items to the two or more packing stations, respectively, the two or more subsets being mutually disjoint, wherein the two or more packing stations comprise two or more robotic packing stations, the packing scheme further comprising a sequential order of packing the two or more subsets of the set of items at the two or more packing stations paired therewith, wherein the packing scheme determines that packing of the set of items and transporting thereof to the destination is to be performed according to the sequential order, wherein the sequential order of packing is determined based on the parameter of the set of items, wherein the parameter comprises degrees of sensitivity of the two or more subsets to exertion of force thereon, wherein in each packing station paired with a subset of the two or more subsets, a respective portion of the set of items in the subset is to be packed and transported from the packing station to the destination or to a subsequent packing station, wherein the subsequent packing station is defined by the sequential order of packing; and, responsive to determining that the one or more optimality criteria are satisfied by the packing scheme, packing the set of items according to the packing scheme, wherein said packing comprises the two or more robotic packing stations automatically executing the customer order according to the sequential order of packing.

18. The non-transitory computer readable storage medium of claim 17, wherein said determining the packing scheme comprises:

for each packing station of the two or more packing stations, assigning to each item of the set of items a cost for packing the item at the packing station in accordance with a predetermined ordering; and, applying an optimization problem solving process to obtain a packing scheme, wherein the optimization problem solving process is configured to select the sequential order based on minimizing a total cost of executing the customer order.

* * * * *